(12) United States Patent
Lux et al.

(10) Patent No.: US 9,322,937 B2
(45) Date of Patent: Apr. 26, 2016

(54) METHOD AND DEVICE FOR DETECTING IONISING RADIATION USING A PIXELATED PHOTODETECTOR

(71) Applicant: COMMISSARIAT A L'ENERGIE ATOMIQUE ET AUX ENERGIES ALTERNATIVES, Paris (FR)

(72) Inventors: Silvere Lux, Schirrhein (FR); Guillaume Montemont, Grenoble (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 0 days.

(21) Appl. No.: 14/434,287

(22) PCT Filed: Oct. 8, 2013

(86) PCT No.: PCT/EP2013/070916
§ 371 (c)(1),
(2) Date: Apr. 8, 2015

(87) PCT Pub. No.: WO2014/056893
PCT Pub. Date: Apr. 17, 2014

(65) Prior Publication Data
US 2015/0260854 A1    Sep. 17, 2015

(30) Foreign Application Priority Data
Oct. 8, 2012    (FR) .................................... 12 59541

(51) Int. Cl.
*G01T 1/26* (2006.01)
*G01T 1/24* (2006.01)
*G01T 1/29* (2006.01)

(52) U.S. Cl.
CPC ................ *G01T 1/24* (2013.01); *G01T 1/2914* (2013.01); *G01T 1/2928* (2013.01)

(58) Field of Classification Search
CPC ........... G01T 1/24; G01T 1/26; G01T 1/2928; H01L 31/00; G01J 5/046
See application file for complete search history.

(56) References Cited

U.S. PATENT DOCUMENTS 6,002,741 A    12/1999    Eisen et al.
6,169,287 B1    1/2001    Warburton
(Continued)

FOREIGN PATENT DOCUMENTS

EP    1 548 465    6/2005

OTHER PUBLICATIONS

International Search Report Issued Feb. 14, 2014 in PCT/EP13/070916 Filed Oct. 8, 2013.
(Continued)

*Primary Examiner* — David Porta
*Assistant Examiner* — Mamadou Faye
(74) *Attorney, Agent, or Firm* — Oblon, McClelland, Maier & Neustadt, L.L.P.

(57) ABSTRACT

A method for detecting ionizing radiation using a pixelated semi-conductor detector. When the radiation interacts with the detector, the affected pixel is determined, together with the instant of impact for this pixel. A first instant before and a second instant after the instant of impact are deduced from this. The deviations of the signals coming from an assembly of pixels adjacent to the affected point are then measured, with the deviations being measured between the first and second instants. The position of the point of interaction of the radiation with the semi-conductor is estimated from the deviations thus measured.

16 Claims, 8 Drawing Sheets

(56) References Cited

U.S. PATENT DOCUMENTS

| | | | |
|---|---|---|---|
| 2005/0139775 A1* | 6/2005 | Gono | G01T 1/242 250/370.09 |
| 2008/0042070 A1 | 2/2008 | Levin | |
| 2011/0082659 A1* | 4/2011 | Montemont | G01T 1/2928 702/85 |
| 2011/0220804 A1 | 9/2011 | Mihailescu et al. | |
| 2012/0112080 A1 | 5/2012 | Mihailescu et al. | |

OTHER PUBLICATIONS

French Search Report Issued Jul. 1, 2013 in French Patent Application No. 1259541 Filed Oct. 8, 2012.

* cited by examiner

METHOD AND DEVICE FOR DETECTING IONISING RADIATION USING A PIXELATED PHOTODETECTOR

TECHNICAL FIELD

The invention relates in general terms to the field of ionising radiation detectors and that of methods for processing signals from such detectors.

STATE OF THE PRIOR ART

Semi-conductor detectors for ionising radiation such as, for example, X-ray or γ radiation, are well known in the prior art, particularly in the fields of medicine, of astronomy and non-destructive testing.

When these detectors are used for imaging, they must be capable of allowing spatial discrimination of the incident photons.

Figure 1:
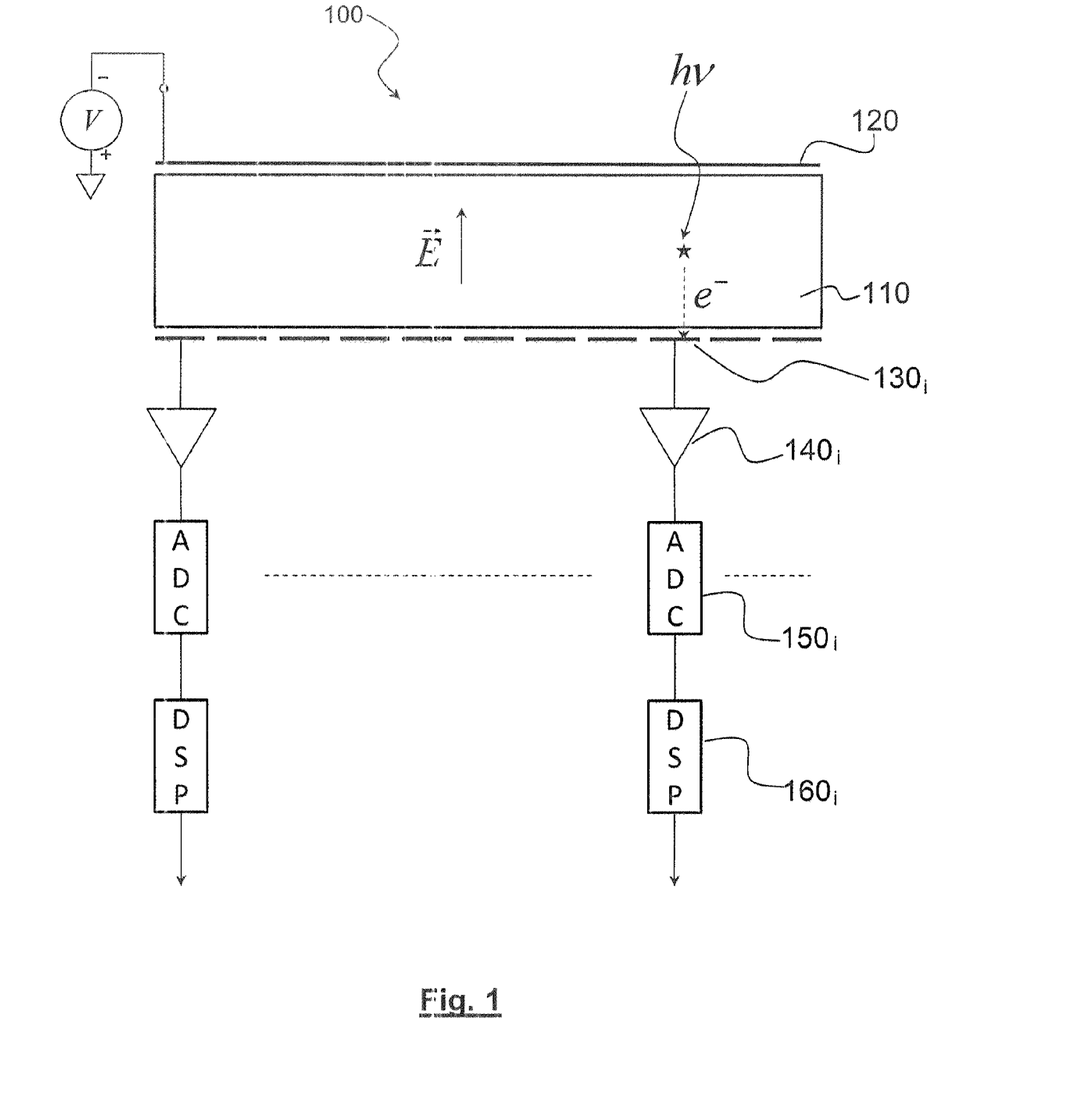
FIG. 1 already described schematically shows the structure of an ionising radiation detector that is known to the current art.

An ionising radiation detector structure commonly used for imaging is shown in FIG. 1.

This detector 100 comprises a semi-conductor element 110 whose front side, exposed to the incident radiation is covered with a first electrode 120 and the rear side is covered with multiple second elementary electrodes $130_i$ distributed in a one- or two-dimensional periodic arrangement. Thus, depending on the case, the second elementary electrodes can take form of strips which are periodically distributed in one dimension, or of blocks periodically distributed in two dimensions. In what follows, we will conventionally use the name pixels for these second electrodes whether the arrangement is one- or two-dimensional.

A high voltage is applied between the first electrode on the one hand and the second elementary electrodes on the other hand. In the case that is shown, the first electrode acts as a cathode and the second electrodes act as anodes.

A photon that is incident on the detector and whose energy is greater than the forbidden band of the semi-conductor generates an electron-hole pair, with the electron migrating towards one anode and the hole towards the cathode due to the effect of the electric field within the semi-conductor. In general, depending on its energy, an incident photon can generate one or more electron-hole pairs during its interaction with the semi-conductor, each pair exhibiting the indicated behaviour.

Each second elementary electrode or pixel $130_i$ is connected to a pre-amplifier $140_i$. The signal from the pixel $130_i$ which is proportional to the collected charge and therefore to the energy deposited by the photon, is amplified by the pre-amplifier $140_i$, then digitised by an analogue-digital converter $150_i$, before being processed by a digital signal processing (DSP) integrated circuit, $160_i$, generally in the form of an ASIC or FGPA circuit.

Thus, when an incident photon interacts with the semi-conductor, the pixel located to the right of the interaction position collects a charge which is expressed a pulse at the input to the pre-amplifier. It is therefore possible, after processing, to determine the pixel that has been "affected", in other words the one that collected this charge, and to determine from it the coordinates of the point of interaction with a precision that is equal to the pixelation step, that is to say the spatial period of the pixels.

Determination of the point of interaction may be affected by two disturbance phenomena however.

The first, so-called "charge sharing" phenomenon occurs when the pixelation interval is small relative to the size of the charge cloud created during the interaction. In such a situation the various charges, for example electrons in the case of a pixelated anode, may be collected by adjacent pixels. The extent of the phenomenon furthermore depends on the geometry of the detector, on the energy of the incident photon and on the depth of interaction.

The second phenomenon is that of so-called "induced charge". In effect, when a charge carrier is generated and then migrates in the semi-conductor, 110, it induces a current in the elementary electrodes $130_i$. Since the electrons have a mobility which is greater than that of the holes, at the output from the pixels surrounding the affected pixel one generally sees first of all a positive lobe then a negative lobe appearing, with the instant of sign inversion substantially corresponding to the instant the electron or electrons are collected by the affected pixel. The induced charge phenomenon is described widely in the literature and is referred to in U.S. Pat. No. 6,169,287.

A first way to improve the spatial resolution of pixelated semi-conductors is to reduce the pixelation interval. The charge sharing phenomenon mentioned above does not however allow any significant gains in resolution to be achieved; neither does it allow the energy deposited by the photon to be estimated with precision. Furthermore, it requires a very large number of amplifiers, ADC converters and processing circuits, leading to complex and costly detectors. Furthermore, this results in difficulties in hybridisation of the detector in the circuit.

A second, more promising, route consists of processing the signals coming from several adjacent pixels in order to achieve a resolution which is smaller than the pixelation interval.

The U.S. Pat. No. 6,002,741 describes a detector wherein the position of interaction of a photon is obtained with a resolution which is smaller than the detector's pixelation interval. More precisely, it proposes interpolation of the respective values of the signals coming from the affected pixel and adjacent pixels at the instant of interaction, in order to obtain a charge profile at that instant and comparing the profile thus obtained with typical profiles, calculated for possible points of interaction separated by a distance that is smaller than the pixelation interval, with the typical profile which is the closest to that obtained providing the coordinates for the point of interaction. This method however has the drawback of using signals from pixels adjacent to the pixel affected at the moment when the signals are very small, with the result that they are usually drowned out by the noise. A significant error in the coordinates of the point of interaction could therefore result from this.

The aforementioned U.S. Pat. No. 6,169,287 also describes a method for improving the spatial resolution of the detector using transient signals coming from pixels adjacent to the affected pixel. More precisely, it proposes calculating a differential response obtained from the difference between the signals coming from the adjacent pixel to the left and the adjacent pixel to the right of an affected pixel and deducing the position of the point of interaction from the amplitude peak for this differential response. The drawback of this method is again that it is very sensitive to noise, in particular when the interaction position is close to the centre of the affected pixel. In effect, in this case the amplitude of the differential response is very small, with the charges induced in the adjacent pixels being symmetrically distributed around the centre of the pixel in question. The result of this is that the amplitude peak may then be drowned by the noise, and that errors adversely affect the estimate of the interaction position.

One purpose of the present invention is consequently to propose a method for detecting ionising radiation using a pixelated semi-conductor detector which allows a spatial resolution to be achieved which is smaller than the pixelation interval, whilst ensuring an adequately robust estimate of the interaction position to be made as regards noise. Another purpose of the invention is to propose a pixelated semi-conductor detector structure that allows said method to be implemented. Finally, a subsidiary purpose of the invention is to propose a method for calibrating such a pixelated semi-conductor detector.

DESCRIPTION OF THE INVENTION

The present invention is defined as a method for detecting ionising radiation with the aid of a semi-conductor detector which is pixelated as multiple pixels, where each pixel provides a signal which is characteristic of the charge it collects during an interaction of ionising radiation with the detector, the method comprising the following steps:

(a) determination of a pixel, called the affected pixel, whose signal amplitude exceeds a predetermined threshold;

(b) determination of an instant, called the instant of impact, from the signal of said affected pixel and obtaining a first instant, determined from the instant of impact;

(c) for at least one pixel adjacent to the affected pixel, determination of a measurement of the signal of said adjacent pixel at said first instant;

(d) estimation of at least one coordinate of the point of interaction of the ionising radiation from said measurement.

Preferably, step (b) comprises in addition the determination of a second instant from the instant of impact, where the first instant occurs before the instant of impact and the second instant occurs after the instant of impact, and step (c) comprises the determination of a deviation of the signal from said adjacent pixel between said first and second instants.

Advantageously, said first and second instants are determined as those which exhibit a maximum statistical dispersion of said signal deviation.

Typically, at step (c) the respective deviations, $M_Q$, of the signals of an assembly V of the pixels adjacent, Q, to the affected point are determined and at step (d), the coordinate of the point of interaction of the ionisation radiation is determined from said deviations.

According to a first embodiment the coordinate, x, of the point of interaction is estimated using an estimate of the maximum likelihood, by jointly maximising the conditional probabilities $p(M_Q|x_i)$, $Q \in V$, where the $x_i$ are multiple discrete possible values of said coordinate, where the conditional probability functions $p(M_Q|x_i)$ have been determined beforehand in a calibration or simulation phase.

The coordinate, x, of the point of interaction can then be estimated by means of:

$$\hat{x} = \underset{i}{\operatorname{argmax}}\left(\prod_{Q \in V} P(M_Q \mid x_i)\right)$$

According to a variant of the first embodiment, the coordinate, x, of the point of interaction is estimated using estimation of the maximum likelihood by jointly maximising the conditional probabilities $p(\overline{M}_Q|x_i)$, $Q \in V$, where $\overline{M}_Q$ is the deviation normalised by the energy $E_0$ of the signal of the affected pixel and where the $x_i$ are multiple discrete possible values of the said coordinate, where the conditional probability functions $p(\overline{M}_Q|x_i)$ have been determined beforehand in a calibration or simulation phase.

The coordinate, x, of the point of interaction can then be estimated by:

$$\hat{x} = \underset{i}{\operatorname{argmax}}\left(\prod_{Q \in V} P(\overline{M}_Q \mid x_i)\right)$$

According to another variant of the first embodiment, the coordinate x, of the point of interaction is estimated using estimation of the maximum likelihood, by jointly maximising the conditional probabilities $p(M_Q|x_i)$ as well as the conditional probabilities $P(E_0|x_i)$, where $E_0$ represents the energy of the signal of the affected pixel and the $x_i$ are multiple values of the possible discrete values of said coordinate, where the conditional probability functions $p(M_Q|x_i)$ and $P(E_0|x_i)$ have been determined beforehand in a calibration or simulation phase.

The coordinate, x, of the point of interaction can then be estimated by:

$$\hat{x} = \underset{i}{\operatorname{argmax}}\left(P(E_n \mid x_i)\prod_{Q \in V} P(M_Q \mid x_i)\right)$$

According to a second embodiment, the coordinate of the point of interaction is estimated by:

$$\hat{x} = U(B_x)$$

where $B_x$ is the coordinate of the barycentre of the pixels of V weighted by their receptive deviations, $M_Q$, and of the affected pixel, weighted by the amplitude of the signal of said affected pixel at the time of impact, and where $U(B_x)$ is a function which renders uniform the distribution of $B_x$ under uniform illumination of the detector, determined by calibration or simulation.

The function $U(B_x)$ is advantageously determined by $U(B_x) = p[F(B_x) - 1/2]$ where p is the pixelation interval of the detector and $F(B_x)$ is the distribution function of the barycentre $B_x$ under uniform illumination of the detector.

The invention also relates to an ionising radiation detector comprising a semi-conductor element which has a front side exposed to the ionising radiation covered with a first electrode, and a rear side covered with multiple elementary electrodes, known as pixels, where each pixel is associated with a reading channel suitable for reading a charge signal coming from this pixel during an interaction of the radiation with the semi-conductor element, said detector furthermore comprising for each reading channel of a pixel:

discrimination means which compare the signal read with a predetermined threshold and which generate a Boolean signal which indicates whether said pixel has been affected;

means of synchronisation which, when the Boolean signal indicates that said pixel is affected, determines the instant, called the instant of impact, at which the signal that is read reaches its maximum:

means of control, which receive the instant of impact and which as a function of these, control means of storage intended to store samples of signals read from an assembly of pixels adjacent to the affected pixel; where the detector furthermore comprises:

a processing unit suitable for obtaining a measurement of a signal read from at least one of said assembly of adjacent pixels, and for determining at least one coordinate of the point of interaction from the measurement thus obtained.

Preferably this processing unit is suitable for calculating the respective deviations of signals read from said assembly of adjacent pixels, where the deviations are calculated between a first instant, before the instant of impact and a second instant, after the instant of impact, with the processing unit determining at least one coordinate of the point of interaction from the deviations thus obtained.

The signals read by the reading channels are advantageously filtered by filtering means upstream of the means of synchronisation and means of storage.

According to a first embodiment, the detector comprises a memory wherein are stored, for each adjacent pixel of said assembly, the conditional probabilities of the deviations, $p(M_Q|x_i)$, for multiple discrete values of the coordinate $x_i$, $i=1, \ldots, N$ The detector may also comprise a memory in which is stored, for each adjacent point belonging to said assembly, a table which gives the statistical distribution of the deviation of the signal read from this pixel.

The invention furthermore relates to a method of calibration of the above detector, according to which:
the detector is swept with a highly collimated beam in order to successively illuminate multiple coordinate points $x_i$, $i=1, \ldots, N$;
for each point thus illuminated, for each pixel affected, the respective deviations, $M_Q$, of the signals read from an assembly of pixels adjacent to the affected pixel, are calculated, the deviations being calculated between said first and second instants;
for each point that is illuminated, a table giving a statistical distribution of deviations, $p(M_Q|x_i)$, is updated.

Furthermore, the deviations of the signals read from an assembly of pixels adjacent to the affected pixel can be normalised by the energy ($E_0$) of the signal of said affected pixel before updating said table.

The invention furthermore relates to a method of calibrating the above detector wherein:
the detector is illuminated using a uniform ionising radiation;
for each pixel affected, the respective deviations, $M_Q$, of the signals read from an assembly of pixels adjacent to the affected pixel, are calculated, with the deviations being calculated between said first and second instants;
for each adjacent pixel belonging to said assembly, a table giving the statistical distribution of the deviation of the signal read from this pixel is updated.

BRIEF DESCRIPTION OF THE ILLUSTRATIONS

DETAILED DESCRIPTION OF PARTICULAR EMBODIMENTS

Figure 2:
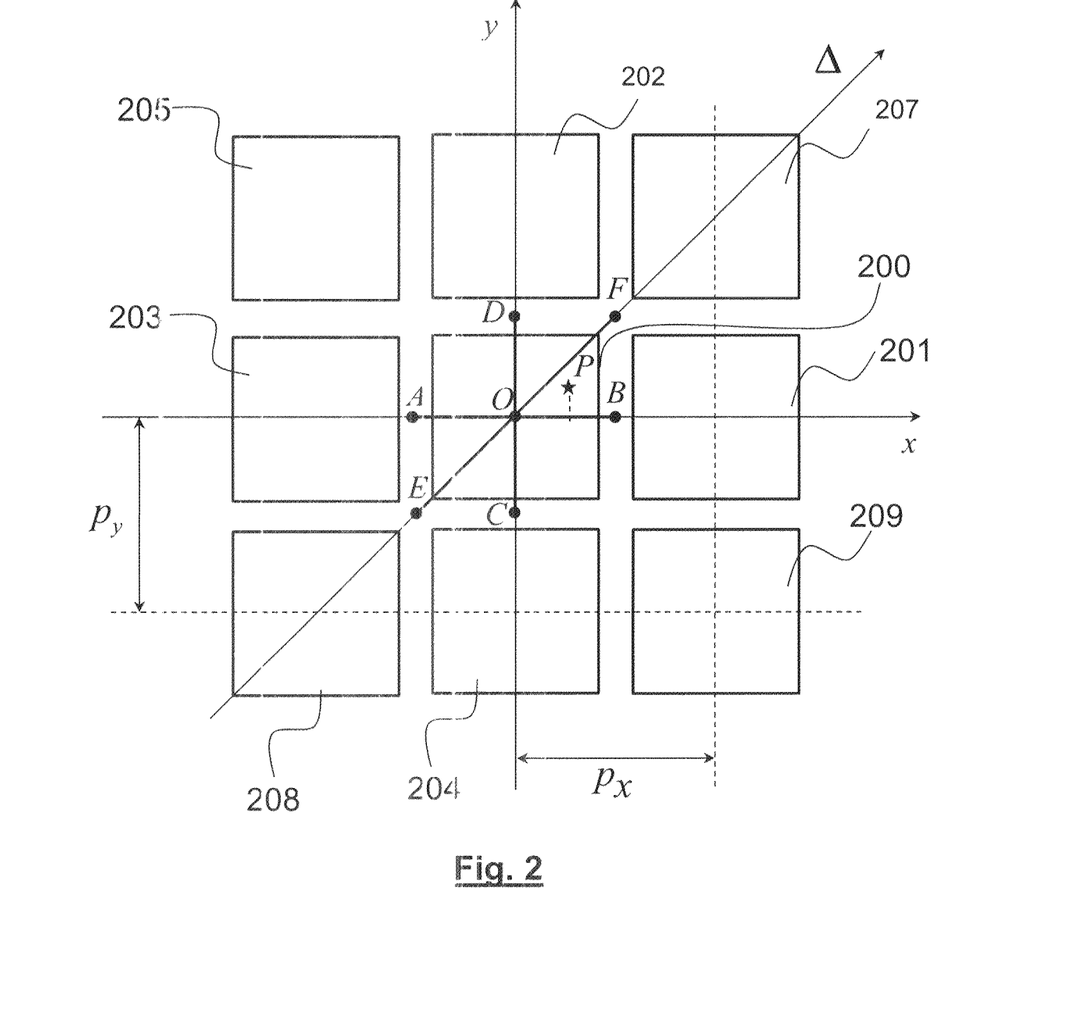
FIG. 2 schematically represents an arrangement of pixels around an affected pixel.

We will consider below an ionising radiation detector which is pixelated in the sense defined above. We will assume that the pixels are arranged along two orthogonal directions Ox and Oy as shown in FIG. 2 and that the pixelation interval in the direction Ox (the spatial period $p_x$ of pixels in the direction Ox) is the same as the pixelation interval in the direction Oy (the spatial period $p_y$ for pixels in direction Oy), $p_x=p_y=p$ it is clear, however, that the invention could be applied if these spatial periods differed. It will also be assumed that the pixelation interval is sufficiently large and the size of the pixels sufficiently great for charge-sharing effects to be negligible. For example, the size of the pixels could be of the order of mm, a size which is much larger than the spatial extent of the charge cloud resulting from the interaction with the semi-conductor (of the order of 100 μm).

Simply for the purposes of illustration, we will assume that the pixels here are anodes, and that a cathode covers the side of the detector exposed to the incident radiation. However, the invention also applies in the symmetrical case, where the pixels are cathodes and where a common anode covers the face of the detector exposed to incident radiation.

The origin O of the detector has been arbitrarily chosen as the centre of the pixel n, 200, which we assume to be the affected pixel, that is, the pixel that collects the electron or electrons coming from the interaction of a photon with the semi-conductor. In addition the projection of the point of interaction in the Oxy plane of the detector is represented by P.

The signal $S_n$, coming from the pixel n, also known as the charge signal, is a function of the collected charge, that is, of the energy supplied to the semi-conductor by the incident photon at the point of interaction.

The signal $S_n$ is advantageously filtered, for example using a cusp filter, which is known per se. This filter exhibits a pulse response of the form $$e^{\frac{|t|}{\tau}}.$$

Alternatively, the signal $S_n$ may be filtered using a Gaussian pulse response filter.

In general terms, the filter that is used will be chosen so as to obtain a pulse whose characteristics (amplitude and/or integral) are proportional to the collected charge.

Figure 3A:
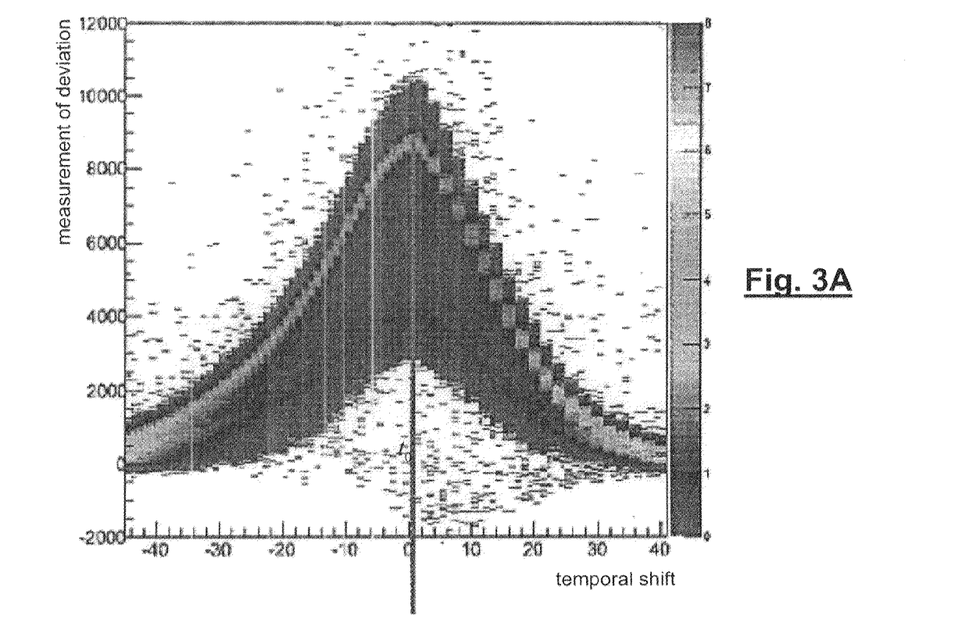
FIG. 3A represents the statistical distribution of a signal of a pixel affected by multiple interactions of incident photons with the semi-conductor.

Graphs of the signal $S_n$ as a function of time, after filtering, are shown in FIG. 3A. More precisely, this figure shows a statistical distribution of the signal $S_n$ for different positions of the interaction point, in other words, for different positions of P inside the surface of the pixel 200. The graphs of the signal $S_n$ have a pulse shape and are substantially symmetrical around an instant in time $t_0$. This time $t_0$ defines the instant when the pixel n is affected and acts as reference time in the remainder of the measurements, as explained below. In what follows, $t_0$ will also be referred to as the instant of impact (of the affected pixel).

Figure 3B:
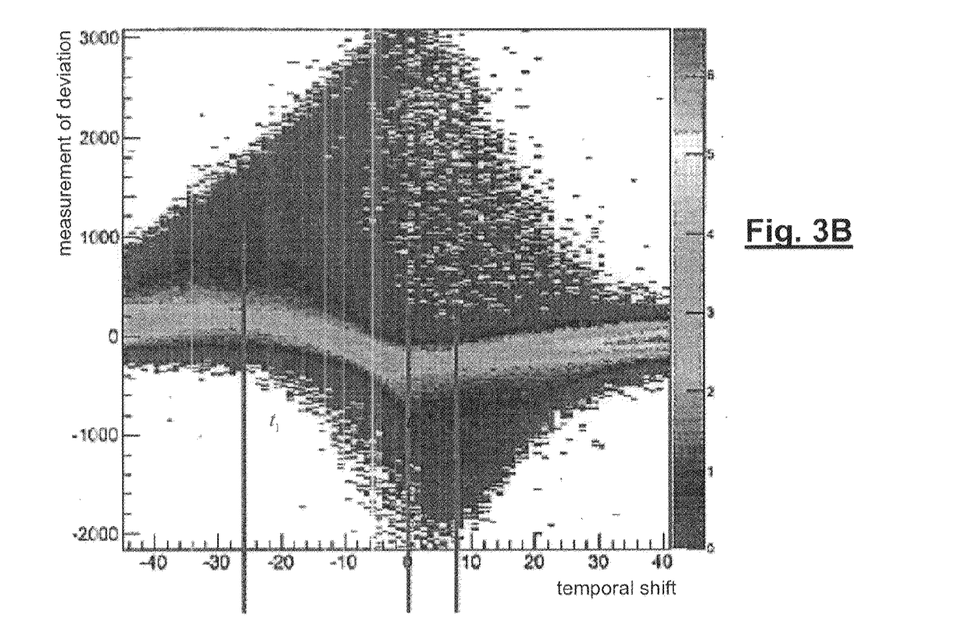
FIG. 3B represents the statistical distribution of the signal of a pixel adjacent to the affected pixel for the same multiple interactions.

FIG. 3B shows a signal coming from a pixel adjacent to the affected pixel, for example the signal from the pixel located on its right, 201, here identified as $S_{n+1}$, or the signal coming from the pixel located on its left, 203, here referred to as $S_{n-1}$. This signal ($S_{n+1}$, $S_{n-1}$) is preferably filtered by a cusp filter, as indicated above.

More precisely, FIG. 3B represents a statistical distribution of such a signal ($S_{n-1}$, $S_{n+1}$), for different positions of the point of interaction, that is for different positions of the projection P inside the affected pixel 200. It can be seen, as stated above, that this signal exhibits a first positive lobe then a second negative lobe, with the change of sign taking place statistically at an instant close to the time $t_0$. The bipolar form of the charge signal would be identical for adjacent pixels in the Oy direction (pixel 202 above the affected pixel and pixel 204 below it) and similar for adjacent pixels of the second order, that is at a distance 2p from the affected pixel. Irrespective of the order of closeness of the pixel involved, a second negative lobe succeeds a first positive lobe. It will be seen that this order would be reversed if the pixels were cathodes and the common electrode was an anode.

A first instant $t_1 = t_0 - \Delta t_1$ and a second instant $t_2 = t_0 + \Delta t_2$, respectively before and after the instant of impact of the affected pixel are considered; in other words a time instant $[t_1 t_2]$ bracketing the instant of impact is considered. The instants $t_1$ and $t_2$ are preferably chosen such that they correspond to a maximum dispersion of the amplitude of the charge signal, as shown in FIG. 3B. More precisely, in a prior calibration phase or through simulation, homogeneous irradiation of the pixel n can be performed, and the statistical distribution of the amplitude of the signal coming from an adjacent pixel (for example n−1,n+1) can be considered. The instant $t_1$ (or $t_2$ respectively) is then determined as the instant before (or after respectively) the instant of impact $t_0$ where the signal amplitude dispersion is at a maximum. The temporal shifts $\Delta t_1$ and $\Delta t_2$, which are used later for carrying out measurements, can then be deduced In what follows $M_{n+1}$, the deviation of the signal $S_{n+1}$ between the first instant $t_1$ and the second instant $t_2$, will be given by $M_{n+1} = S_{n+1}(t_0 - \Delta t_1) - S_{n+1}(t_0 + \Delta t_2)$. Similarly, $M_{n-1}$ the deviation of the signal $S_{n-1}$ at these same instants will be given by $M_{n-1} = S_{n-1}(t_0 - \Delta t_1) - S_{n-1}(t_0 + \Delta t_2)$. More generally, the deviation $M_{n+1}(M_{n-1})$ will be characteristic of the difference in signal amplitude $S_{n+1}(S_{n-1})$ between the first instant $t_1$ and the second instant $t_2$.

The idea upon which the invention is based is to acquire the deviation of the signal for at least one pixel adjacent to the affected pixel, in a manner which is synchronous in relation to the instant of impact, and to determine the coordinates of the point of interaction in the plane of the detector from at least this deviation. In effect, this deviation is calculated using time intervals ($\Delta t_1$, $\Delta t_2$) which are predetermined in relation to the instant of impact $t_0$. This instant is determined then from the signal $S_n$ produced by the affected pixel, with such a signal usually exhibiting and good signal-to-noise ratio. Consequently, the instant $t_0$, and therefore the first and second instants $t_1$, $t_2$, are determined with high precision. Furthermore, said first and second instants are defined in such a way that the charge signal dispersion is a maximum for various positions of the point of interactions within the affected pixel. In other words, the deviation calculated on the basis of these instants varies greatly with the position of interaction. The measurement of the position of the point of interaction is therefore robust in terms of the noise affecting the signals, from pixels adjacent to the affected pixel.

Figure 4:
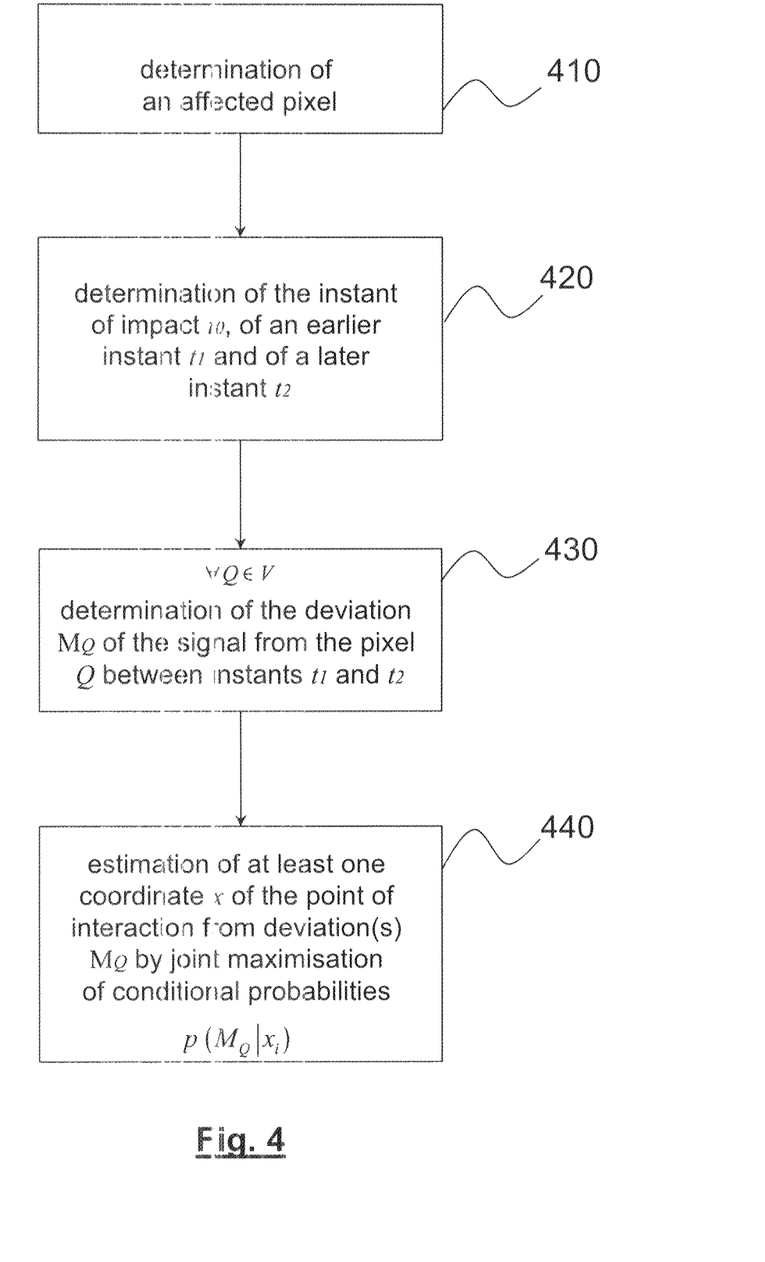
FIG. 4 schematically shows a flow chart of the method for detecting ionising radiation according to a first embodiment of the invention.

FIG. 4 schematically shows the method of detecting ionising radiation according to a first embodiment of the invention.

In a first step 410, an affected pixel is determined, that is, a pixel which provides a charge signal which exceeds a predetermined threshold. A peak detection of the charge signal can be performed for each pixel of the detector in order to do this. When the maximum of this signal, $E_n$, obtained by peak detection, is greater than a predetermined threshold, the correspond pixel is considered to be an affected pixel. In a variant, the value $E_n$ of this maximum, which is indicative of the energy received, is also stored.

In a second step, 420, the instant of impact, $t_0$ of the affected pixel is determined and from it a first instant $t_0 - \Delta t_1$ before, and a second instant $t_0 + \Delta t_2$ after the instant of impact is deduced, the temporal shifts $\Delta t_1$ and $\Delta t_2$ having been obtained by means of a prior calibration or simulation phase, as explained above.

In a third step, 430, the deviation of a first signal coming from a pixel adjacent to the affected pixel is determined, between the instants $t_0 - \Delta t_1$ and $t_0 + \Delta t_2$. In more general terms, a non-empty assembly V of pixels adjacent to the affected point in the plane Oxy will be considered, and for each pixel Q∈V, the deviation $M_Q$ of its signal between the instants $t_0 - \Delta t_1$ and $t_0 + \Delta t_2$ will be determined.

When the determination of the coordinate x of the point of interaction along the axis Ox is involved, the assembly V will preferably contain at least one pixel, aligned with the affected pixel along this axis (for example the pixel 201 or 203 in FIG. 2). Similarly, when the determination of the coordinate y of the point of interaction along the axis Oy is involved, the assembly V will preferably contain at last one pixel aligned with the affected pixel along this axis (for example pixels 202 and 204 in FIG. 2) In order to simultaneously determine the coordinates x,y, the assembly may comprise both the previous pixels or even a single one (for example one of pixels 205, 207, 208 or 209).

In certain cases, the assembly V will be made up of two pixels not necessarily located on either side of the affected pixel. They may be first-order neighbours, that is, immediately adjacent, or higher-order neighbours of the affected pixel. Finally, both pixels in question may or may not be aligned with the affected pixel. Preferably, however, when determination of the coordinate x of the point of interaction along an axis Ox is involved, the adjacent pixels 201 and 203 aligned along Ox with the affected pixel 200 will be considered. Alternatively, pixels 205, 207 or even 208, 209 can be taken into consideration. Similarly, when determination of the coordinate y of the point of interaction along an axis Oy is concerned, adjacent pixels 202 and 204 will be considered. Alternatively, pixels 205, 208 or even 207, 209 can be taken into consideration.

In a fourth step, 440, at least one coordinate of the point of interaction is estimated from deviations of signals from pixels belonging to V, as obtained in the previous step. As already stated, the assembly V can be reduced to a singleton.

In the first embodiment, it is assumed that for each pixel of V the probability distribution of the deviation of the signal for this pixel has been determined beforehand in a calibration or simulation phase, for multiple discrete values $x_i$ (or $y_i$) of the coordinate of the point of interaction. For example, the discrete values may be $$x_i = (i/N)\frac{p}{2}$$

where i=−N, . . . , 0, . . . N where N is a non-zero integer which depends on the desired level of resolution.

During the prior calibration or simulation phase, the conditional probability functions $p(M_Q|x_i)$ are determined for each pixel Q∈V. Given that the arrangement of pixels is invariant in terms of translation within the plane, it is sufficient to determine a number (2N+1).Card(V) of functions for the entire detector.

In practice, in order to calibrate the detector, a pixelation interval of the latter is swept by a highly collimated beam of known energy E. This sweep is advantageously carried out along the axis of the coordinate that it is desired to estimate later. In other words, for estimation of the coordinate x, the calibration sweep is made along the Ox axis (for example from x=−p/2 to x=+p/2, see segment AB in FIG. 2), for estimation of coordinate y, the calibration sweep is made along axis Oy (for example from y=−p/2 to y=+p/2, see segment CD in FIG. 2). For simultaneous calibration along both Ox and Oy, a sweep along a bisecting axis can be performed (for example along axis Δ, see segment EF in FIG. 2).

For each value of the coordinate $x_i$ (or $y_i$) swept by the beam, the statistical distribution of deviations $M_Q$, Q∈V, is recorded, otherwise known as the conditional probability function $p(M_Q|x_i)$. These functions take the form of a table of values stored in memory (look-up table) for each value of the coordinate involved $x_i$ (and/or $y_i$).

According to a first variant, in step 440, therefore, the coordinate x of the point of interaction is estimated by maximising using an estimate of maximum likelihood, by jointly maximising the combined probabilities $p(M_Q|x_i)$, for example by maximising their product:

$$\hat{x} = \underset{i}{\operatorname{argmax}}\left(\prod_{Q\in V} P(M_Q | x_i)\right) \quad (1)$$

It should be noted that, alternatively, other increasing functions of the probabilities $p(M_Q|x_i)$ may be envisaged, for example $$\sum_{Q\in V} p(M_Q | x_i) \text{ or } \sum_{Q\in V} \log[p(M_Q | x_i)].$$

In one particular case, if the assembly V is reduced to the adjacent pixel to the left and to the adjacent pixel to the right of the affected pixel, and if the same notation as previously used is retained:

$$\hat{x} = \underset{i}{\operatorname{argmax}}(P(M_{n-1} | x_i) \cdot P(M_{n+1} | x_i)) \quad (2)$$

In the calibration or simulation phase, the conditional probability equation for the amplitude of the signal received by the affected pixel, $P(E_n|x_i)$, can be determined for the different possible values $x_i$ of the coordinate of the point of interaction. In effect, the probability distribution $P(E_n|x_i)$ differs according to whether the projection P of the point of interaction is close to or far from the centre of the affected pixel. Like the functions $p(M_Q|x_i)$, the probability functions $P(E_n|x_i)$ can be stored in the form of a look-up table for each coordinate that is swept $x_i$. The estimate of the position of the point of interaction can then be improved by taking the measurement of the amplitude of the signal received into account in 440 in seeking the maximum likelihood:

$$\hat{x} = \underset{i}{\operatorname{argmax}}\left(P(E_n | x_i)\prod_{Q\in V} P(M_Q | x_i)\right) \quad (3)$$

Naturally, as before, other alternative increasing functions of $p(M_Q|x_i)$ and $P(E_n|x_i)$ may be envisaged.

In all cases this first variant nevertheless assumes that the calibration/simulation phase has been carried out with the same radiation energy as that of the measurement, which assumes that the latter is known.

On the other hand, if the energy of the radiation during the measurement is not known, in a second variant a normalisation step (optional step 435) is carried out prior to the estimation step 440. Step 435 consists of normalising the deviations $M_Q$ by the energy received by the pixel affected. In other words, each deviation $M_Q$ is replaced by its normalised value $M_Q/E_n$ where $E_n$ is the indicative value of the energy received by the affected pixel, stored in step 410. Estimation is then carried out using the expression (1) applied to the incursions thus normalised.

Figure 5A:
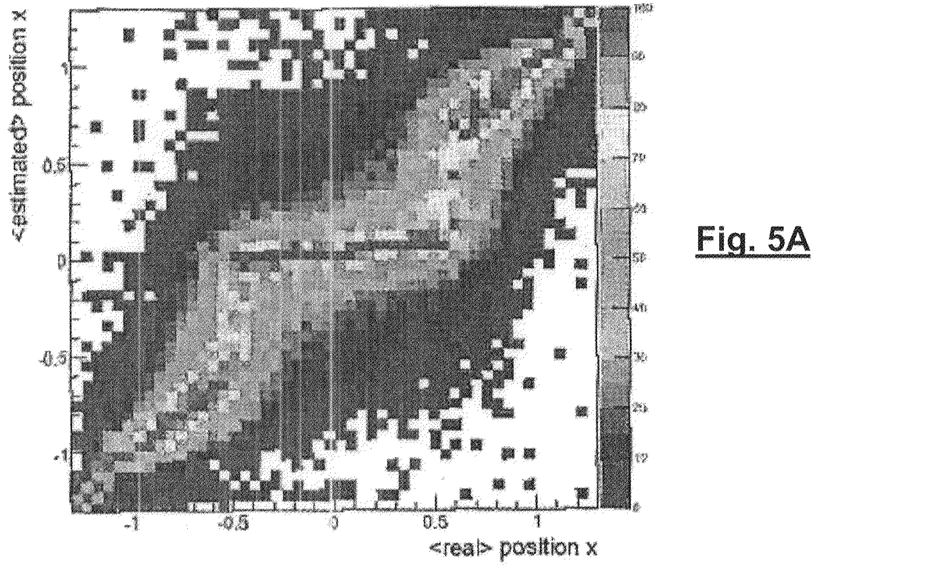
FIG. 5A shows the relationship between the interaction position, estimated using a method of detection known to the prior art, and the true interaction position.

FIG. 5A represents the relationship between the actual position (abscissa) and the estimated position (ordinate) of the point of interaction using a method for detecting incident radiation according to the prior art and more precisely according to the method described in aforementioned U.S. Pat. No. 6,169,287, based on a differential response from two adjacent pixels.

Figure 5B:
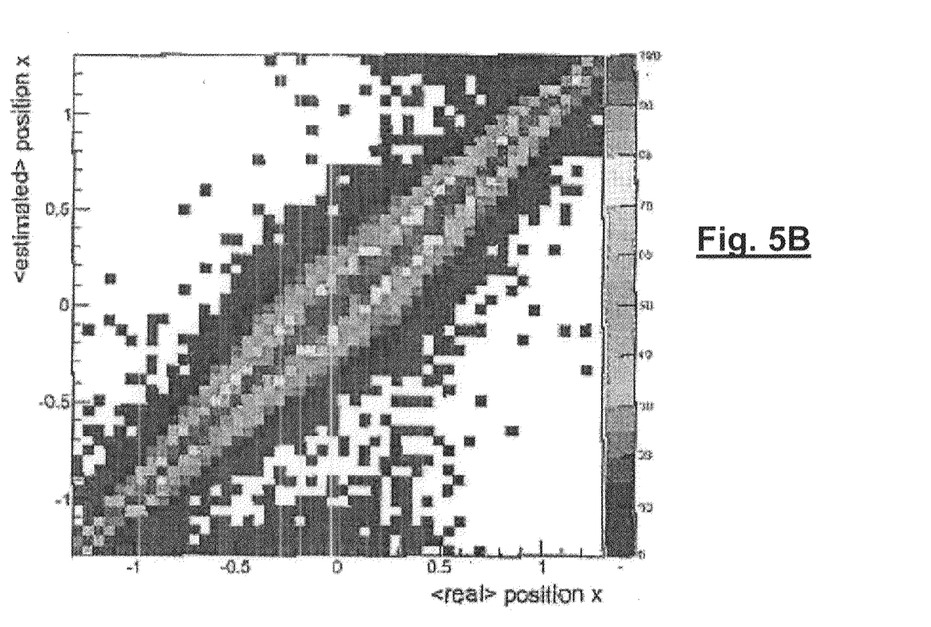
FIG. 5B shows the relationship between the interaction position, estimated using the method of detection known according to the first embodiment of the invention, and the true interactive position.

FIG. 5B similarly represents the relationship between the real position and the estimated position of the point of interaction by an estimation method according to the first embodiment of the invention, and more precisely using expression (2) above.

It can be seen that the correlation between the position estimated according to the first embodiment of the invention and the true position is substantially better than that for the prior art. This improvement in the estimation of the position of interaction is essentially due to the fact that the deviation measurement are made at instants $t_0-\Delta t_1$ and $t_0+\Delta t_2$, synchronised in relation to the instant of impact $t_0$, with the intervals $\Delta t_1$ and $\Delta t_2$ being chosen so as to increase the precision of location of the interaction.

Figure 6:
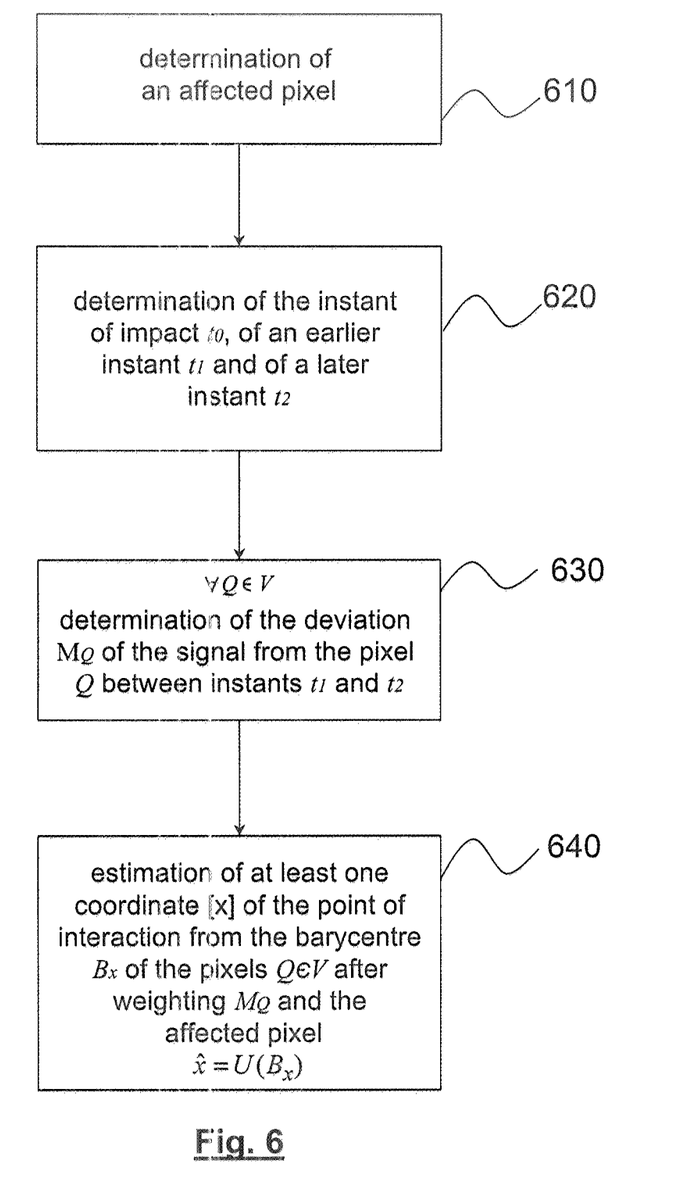
FIG. 6 schematically shows a flow chart of the method for detecting ionising radiation according to a second embodiment of the invention.

FIG. 6 schematically shows the method of detection of ionising radiation according to a second embodiment of the invention.

Steps 610, 620 and 630 are, respectively, identical to steps 410, 420 and 430 of the first embodiment and therefore their description will not be repeated here.

At step 640, at least one coordinate of the point of interaction is estimated from deviations of signals from pixels belonging to V. In the second embodiment, Card(V)≥2, in other words at least two pixels adjacent to the affected pixel are considered. The assembly V is selected such that the adjacent pixels surround the affected pixel, that is, more precisely, in such a way that the centre of the affected pixel is inside a polygon which joins the centre of the pixels of V.

The coordinate x of the point of interaction is then estimated from:

$$\hat{x} = U(B_x) \quad (4)$$

where $B_x$ is the coordinate along Ox of the barycentre B of the pixels of V weighted by their respective deviation values $M_Q$ and U is a function which will be explained below.

The coordinate y of the point of interaction ŷ=U(B$_y$) would be estimated in the same way, where B$_y$ is the coordinate along Oy of the barycentre B.

In order to simplify the description, but without prejudice to generalisation to the bi-dimensional case, we will describe below the second embodiment in a one-dimensional case.

The pixels of V are therefore located on the axis Ox on either side of the affected point. For example, the pixels of V may be selected as being those located at the points of coordinates $x_k$=kp, k∈{k$_0$−K, . . . , k$_0$−1, k$_0$+1, . . . , k$_0$+K}.

In this case the coordinate B$_x$ of the barycentre can be calculated using:

$$B_x = \frac{\sum_{k=k_0-K}^{k=k_0+K} M_{(k)} x_k}{\sum_{k=k_0-K}^{k=k_0+K} M_{(k)}} \quad (5)$$

where $M_{(k)}$, k≠k$_0$, designates the deviation of the signal $S_k$ coming from the pixel k between instants $t_1$ and $t_2$ previously defined and $M_{(k_0)}$ designates the amplitude of the signal coming from the affected pixel.

More generally, the coordinate of the barycentre can be calculated by weighting the various deviations using coefficients which give the relevance of the respective contributions from the various pixels, with a pixel further from the affected pixel being assigned a smaller coefficient than a pixel closer to the affected pixel:

$$B_x = \frac{\sum_{k=k_0-K}^{k=k_0+K} \alpha_k M_{(k)} x_k}{\sum_{k=k_0-K}^{k=k_0+K} \alpha_k M_{(k)}} \quad (6)$$

where the $\alpha_k$ (positive integers) are weighting coefficients which depend on the position of the pixel k relative to the affected pixel k$_0$. These coefficients may be determined by simulation. The value of a weighting coefficient is greater if the corresponding pixel is closer to the affected pixel. The value of the coefficients $\alpha_k$ is generally between 0 and 2. For example, we could take $\alpha_{k_0}$=2, $\alpha_{k_0 \pm 1}$=1, $\alpha_{k_0 \pm 2}$=0.3 when K=2.

In all cases the barycentre is obtained as the normalised weighted sum of the signal measurements made on the affected pixel and on the adjacent pixels.

To simplify the description of the second embodiment, we will assume in what follows that the origin of the detector is taken at the centre of the affected pixel.

When the detector is uniformly illuminated, that is, when the photons reach the detector randomly and uniformly, B$_x$ is a random variable, non-uniformly distributed over the interval [−p/2,p/2]. The value B$_x$ (or a linear function of B$_x$) cannot therefore be used during the measurement to estimate the coordinate of the point of interaction.

The function U chosen to render the distribution of the coordinate of the barycentre uniform, in other words to equalise its histogram over the interval [−p/2, p/2] is given by:

$$U(B_x) = (F(B_x) - 1/2)p \quad (7)$$

where U(B$_x$) is the distribution function of the random variable B$_x$, when the detector is uniformly illuminated. In effect, the distribution function F(B$_x$) is by definition a random uniform variable (with interval [−p/2, p/2] over the interval [0,1]) and the function U(B$_x$) is therefore itself a random variable uniformly distributed over [−p/2,p/2] and which takes its values from the same interval.

Figure 7A:
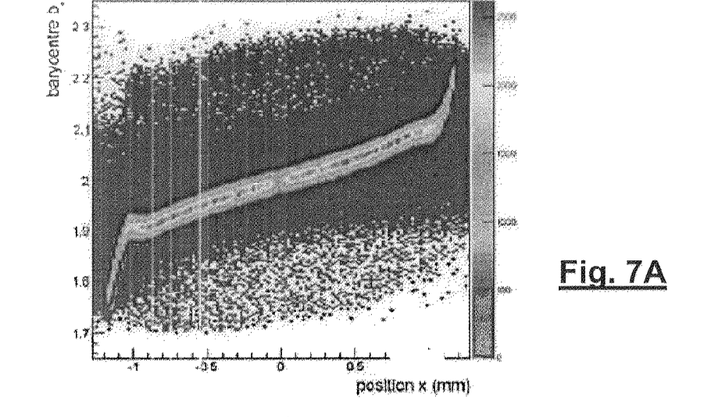
FIG. 7A shows the statistical distribution of a barycentre when the detector is uniformly illustrated.

FIG. 7A schematically shows the statistical distribution of a barycentre of pixels of V as a function of the various positions of the point of interaction.

More precisely, in FIG. 7A the axis of the abscissa coincides with the axis Ox of the detector and the values taken by the random variable B$_x$, when the detector is uniformly illuminated are shown in the ordinate. The barycentre considered here is that of the pixels to the left and to the right of the affected point (B$_x$ then being obtained from expression (5) where K=1).

For each value of B$_x$, the number of impacts, that is the number of times that this value is observed, is shown by a colour level.

Figure 7B:
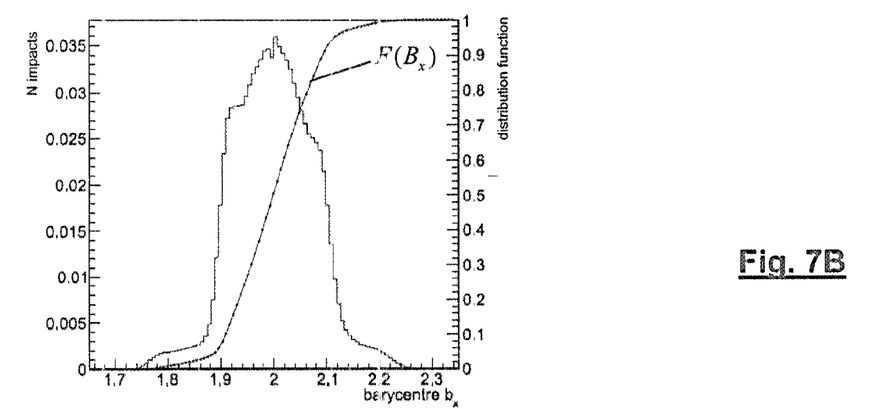
FIG. 7B shows the histogram of this barycentre.

FIG. 7B shows the histogram of B$_x$ which corresponds to the observations of FIG. 7A. This histogram has been obtained by summing for each value of B$_x$, the number of occurrences observed in the segment [−p/2,p/2]. This figure also shows the distribution function of B$_x$, taking its values over the interval [0,1], shown at the right of the figure.

Figure 7C:
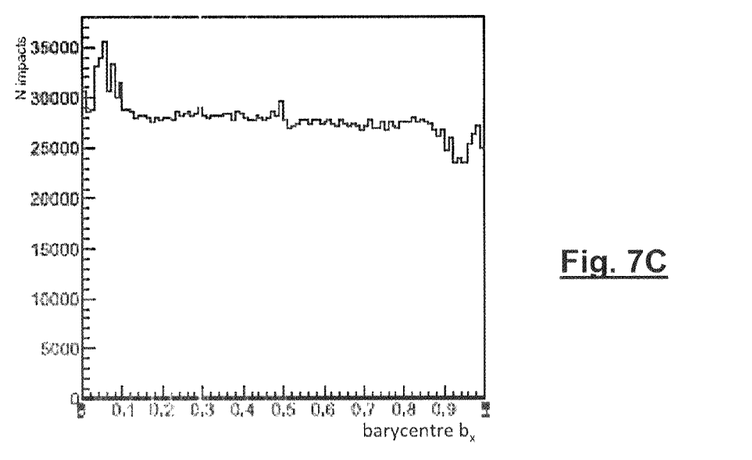
FIG. 7C shows the histogram of a transform of this barycentre.

FIG. 7C shows the histogram of a transform of this barycentre, by the function U. It can be seen that the random variable U(B$_x$) is substantially uniformly distributed over [−p/2,p/2]. In practice, the relatively small deviation from uniformity observed at the edge of the affected has little effect on the quality of the estimate of the position of the point of interaction.

As stated above, the method for estimating the position of interaction according to the second embodiment of the invention requires a prior calibration phase. It is of note that unlike the first embodiment, calibration is carried out under uniform illumination of the detector and not by sweeping using a highly collimated beam.

In practice the probability function of the coordinate B$_x$ of the barycentre will be determined in this phase. In order to do this, for each event, that is for each pixel affected, the deviations M$_Q$ of the signals coming from adjacent pixels Q∈V (as well as the value of the amplitude of the signal coming from the affected pixel) is measured and the coordinate B$_x$ of the barycentre B is calculated.

The histogram of the values of B$_x$ thus obtained (as shown in FIG. 7B) gives its probability function. From this histogram the distribution function F(B$_x$) is determined and U(B$_x$) is deduced from this for each value of B$_x$. The values U(B$_x$) as a function of B$_x$ are stored in memory in the form of a table (look-up table).

During the later measurement phase, that is during the estimation of the position of interaction of the radiation, at step 640 the coordinate B$_x$ of the barycentre of the deviations M$_Q$ is calculated (as well as the value of the amplitude of the signal coming from the affected pixel) and from this the estimate ê=U(B$_x$) is deduced using the aforementioned table.

Figure 8:
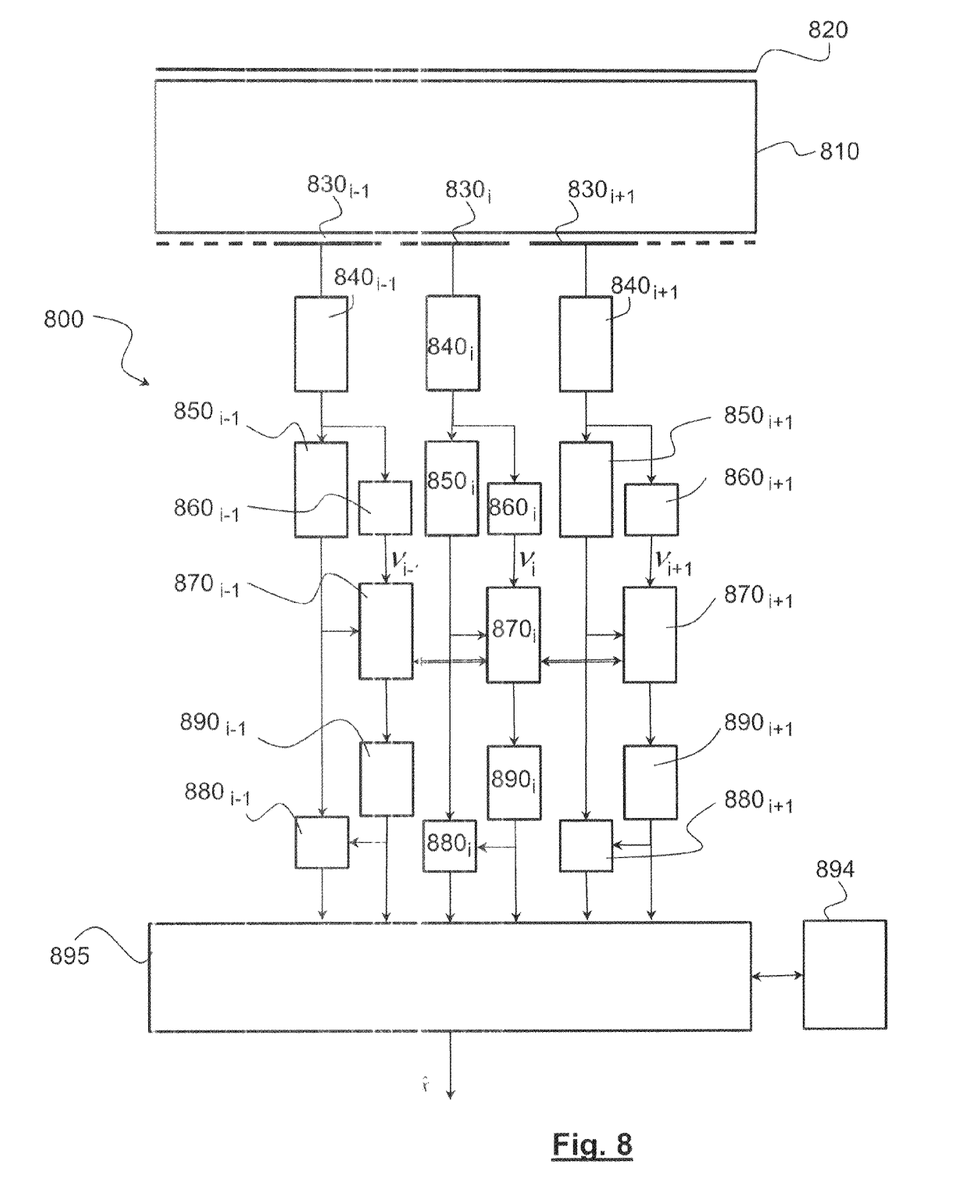
FIG. 8 is a schematic representation of the structure of an ionising radiation detector according to one embodiment of the invention.

FIG. 8 is a schematic representation of the structure of an ionising radiation detector according to one embodiment of the invention.

The ionising radiation detector 800 comprises a semi-conductor element 810 whose front side exposed to the incident radiation is covered with a first electrode 820 and the rear side is covered with multiple second elementary electrodes or pixels 830$_i$ distributed according to a one- or two-dimensional periodic arrangement.

With each pixel 830$_i$ there is associated a reading channel 840$_i$ suitable for reading the charge signal coming from this pixel. This reading channel can itself compose different processing stages such as pre-amplification, pre-filtering and analogue-digital conversion. Analogue-digital conversion can take place for example at the output from the pre-amplification stage or at the output from the filtering step.

The signal at the output of the channel $840_i$ is on one hand filtered by a filter $850_i$ and on the other hand analysed by a threshold discriminator $860_i$.

The filter $850_i$ is a linear filter (or not) designed to shape the received pulse. It may be, for example, a cusp filter or a Gaussian response filter, known per se.

The threshold discriminator $860_i$ detects whether or not the signal from the channel $840_i$ crosses a predetermined threshold and generates a Boolean signal $v_i$ indicating whether or not this threshold has been crossed. The signal $v_i$ indicates whether the pixel $830_i$ has been affected.

The shaped signal at the output from the filter $850_i$, together with the Boolean signal $v_i$, is fed to a synchronisation device $870_i$. When the signal v indicates that the pixel $830_i$ has been affected, the synchronisation device carries out detection of the peak of the shaped signal and identifies the instant $t_0^i$ at which the pulse maximum is reached. It thus provides the instant $t_0^i$ as well as, optionally, the maximum value of the shaped signal, $E_0^i$, reached at the instant $t_0^i$.

The shaped signal, at the output of $850_i$, is also provided to a FIFO buffer $880_i$ which continuously stores the L latest samples of this signal.

The control module, $890_i$, receives the instant $t_0^i$ and stops the writing into the buffer so that the samples of the pulse around $t_0^i$ are stored there. What is more, the control module generates multiple Card(V) signals (not shown) which stop writing into the buffers associated with the adjacent pixels Q∈V.

If appropriate, the respective synchronisation devices for adjacent channels, that is, which correspond to adjacent pixels, are connected together and decide on the affected pixel depending on the respective maxima of the signals read by these channels, that is, decide which pixel has received the strongest pulse (double-line arrows). Thus the synchronisation device $870_i$ can compare the value with with the corresponding values of adjacent channels ($E_0^{i-1}$ and $E_0^{i+1}$ in the case of a one-dimensional arrangement) and deduce from this whether the pixel $830_i$ is in correctly identified as the affected pixel (in which case the adjacent pixels $830_{i-1}$ and $830_{i+1}$ are not the affected pixel).

For each affected pixel a processing unit 895 recovers from buffers $880_i$ the value $E_0^i$ corresponding to the pixel that is (identified as) affected, as well as the amplitudes of signals from adjacent pixels Q∈V at the instants $t_0^i - \Delta t_1$ and $t_0^i + \Delta t_2$ (and if necessary the value of the amplitude of the signal from the affected pixel at the time of impact). It deduces the deviations $M_Q$, Q∈V from this and implements the estimation step 440 of the first embodiment or the estimation step 640 of the second embodiment.

The processing unit 895 is linked to a memory 894 wherein are stored, in the first embodiment, the tables of values $p(M_Q|x_i)$ for each adjacent pixel Q∈V as well as, optionally, the table of values $P(E_0|x_i)$ or, in the second embodiment, the table of values $U(B_x)=(F(B_x)-1/2)p$.

In the calibration phase of the first embodiment, the detector 800 is swept along an axis (Ox, Oy) with a highly collimated beam and for each position of the beam (that is, each position $x_i$, i=1, . . . , N, of the point of interaction), the calculation unit determines the deviations $M_Q$ of the signals coming from the pixels Q∈V adjacent to the affected pixel. For each of the adjacent pixels, it increments a strike counter associated with the value of the deviation $M_Q$ observed (the observed values are ranked in accordance with multiple discrete values). At the end of the illumination of the position of coordinate $x_i$, the conditional probability functions of the deviations $M_Q$, knowing $x_i$, are stored in the memory 894. The process is repeated for each of the positions $x_i$. In order to do this the calculation unit is synchronised with the collimated beam's means of sweeping (not shown).

In the calibration phase of the second embodiment, the detector 800 is uniformly illuminated by ionising radiation. For each event, that is for each interaction, the calculation unit determines the deviations $M_Q$ of the signals coming from the pixels Q∈V adjacent to the affected pixel and calculates their barycentre, and determines its coordinates $B_x$. For each value of $B_x$ observed (the values observed are ranked according to multiple discrete values), a strike counter associated with this value is incremented. At the end of the calibration step, the distribution function $F(B_x)$ is calculated then the function $U(B_x)$ is deduced from this and stored in the memory 894.

In the description of the first and second embodiments, the position of the point of interaction was determined from measurements of deviations of signals coming from pixels adjacent to the affected pixel (and if appropriate, from the amplitude of the signal coming from the affected pixel).

However, more generally these measurements are not necessarily deviations of signals in the sense defined above. For example, a combination could be taken as a measurement of the signal, in particular a linear combination of the amplitude values of this signal at multiple instants $t_1, \ldots t_m$ of said signal coming from the pixel being considered, where the instants $t_1, \ldots t_m$ are determined as a function of the instant of impact $t_0$. It may involve, for example, a linear combination of 4 or 5 amplitude values of the signal coming from the pixel under consideration, at instants which are determined relative to the impact instant $t_0$.

Finally, it is not always necessary to determine two instants which are respectively before and after the instant of impact $t_0$, nor multiple instants $t_1, \ldots t_m$, in order to obtain a signal measurement. In certain cases, it may be possible to simply determine a single instant, before or after this impact time, with the measurement of the signal of an adjacent pixel then being the value taken by the amplitude of the signal coming from this pixel at said instant, whether the latter is before or after the instant of impact.

The invention claimed is:

1. A method for detecting ionising radiation with aid of a semi-conductor detector which is pixelated into a number of pixels, wherein each pixel provides a signal which is characteristic of a charge it collects during interaction of ionising radiation with the detector, the method comprising:
   (a) determination of a pixel, as an affected pixel, whose signal amplitude exceeds a predetermined threshold;
   (b) determination of an instant ($t_0$), as an instant of impact, from the signal of said affected pixel and obtaining a first instant ($t_1$), before the instant of impact together with a second instant ($t_2$), after the instant of impact, wherein the first and second impacts are determined from the instant of impact;
   (c) for at least one pixel adjacent to the affected pixel, determination of a measurement of a deviation of the signal of said adjacent pixel between said first and second instants;
   (d) estimation of at least one coordinate of the point of interaction of the ionising radiation from said measurement.

2. A method for detecting ionising radiation according to claim 1, wherein said first and second instants are determined as those which exhibit maximum statistical dispersion of said signal deviation.

3. A method for detecting ionising radiation according to claim 2, wherein at (c), the respective deviations, $M_Q$, of the signals of an assembly V of pixels, Q, adjacent to the affected point are determined and at (d), the coordinate of the point of interaction of the ionisation radiation is estimated from said deviations.

4. A method for detecting ionising radiation according to claim 3, wherein the coordinate, x, of the point of interaction is estimated using an estimate of maximum likelihood, by jointly maximising conditional probabilities $p(M_Q|x_i)$, $Q \in V$, wherein the $x_i$ are multiple discrete possible values of said coordinate, wherein the conditional probability functions $p(M_Q|x_i)$ have been determined beforehand in a calibration or simulation phase.

5. A method for detecting ionising radiation according to claim 4, wherein the coordinate, x, of the point of interaction is estimated by:

$$\hat{x} = \operatorname*{argmax}_{i}\left(\prod_{Q \in V} P(M_Q | x_i)\right).$$

6. A method for detecting ionising radiation according to a claim 3, wherein the coordinate, x, of the point of interaction is estimated using an estimate of the maximum likelihood, by jointly maximising the conditional probabilities $p(\overline{M}_Q|x_i)$, $Q \in V$, wherein $\overline{M}_Q$ is the deviation normalised by the energy $E_0$ of the signal of the affected pixel and wherein the $x_i$ are multiple discrete possible values of the said coordinate, wherein the conditional probability functions $p(\overline{M}_Q|x_i)$ have been determined beforehand in a calibration or simulation phase.

7. A method for detecting ionising radiation according to claim 6, wherein the coordinate, x, of the point of interaction is estimated by:

$$\hat{x} = \operatorname*{argmax}_{i}\left(\prod_{Q \in V} P(\overline{M}_Q | x_i)\right).$$

8. A method for detecting ionising radiation according to claim 3, wherein the coordinate, x, of the point of interaction is estimated using an estimate of the maximum likelihood by jointly maximising the conditional probabilities $p(M_Q|x_i)$ as well as conditional probabilities $P(E_0|x_i)$ wherein $E_0$ represents the energy of the signal of the affected pixel and the $x_i$ multiple discrete possible values of said coordinate, wherein the conditional probability functions $p(M_Q|x_i)$ and $P(E_0|x_i)$ have been determined beforehand in a calibration or simulation phase.

9. A method for detecting ionising radiation according to claim 8, wherein the coordinate, x, of the point of interaction is estimated by:

$$\hat{x} = \operatorname*{argmax}_{i}\left(P(E_n | x_i)\prod_{Q \in V} P(M_Q | x_i)\right).$$

10. A method for detecting ionising radiation according to claim 3, wherein the coordinate of the point of interaction is estimated by:

$$\hat{x} = U(B_x)$$

wherein $B_x$ is the coordinate of the barycentre of the pixels of V weighted by their respective deviations, $M_Q$, and of the affected pixel, weighted by the amplitude of the signal of said affected pixel at the time of impact, and wherein $U(B_x)$ is a function which renders uniform the distribution of $B_x$ under uniform illumination of the detector, determined by calibration or simulation.

11. A method for detecting ionising radiation according to claim 10, wherein the function $U(B_x)$ is determined by $U(B_x)=p[F(B_x)-1/2]$ wherein p is the pixelation interval of the detector and $F(B_x)$ is the distribution function of the barycentre $B_x$ under uniform illumination of the detector.

12. An ionising radiation detector comprising a semi-conductor element which includes a front side exposed to the ionising radiation covered with a first electrode, and a rear side covered with multiple elementary electrodes, as pixels, wherein each pixel is associated with a reading channel configured to read a charge signal coming from this pixel during an interaction of the ionising radiation with the semi-conductor element, said detector further comprising, for each reading channel of a pixel:
  means of discrimination which compares the signal read with a predetermined threshold and which generate a Boolean signal which indicates whether said pixel has been affected;
  means of synchronisation which when the Boolean signal indicates that said pixel has been affected, determines the instant, as an instant of impact, at which the signal that is read reaches its maximum;
  means of control, which receives the instant of impact and which controls, as a function of the instant of impact, means of storage configured to store samples of signals read from a set of pixels adjacent to the affected pixel;
  wherein said detector further comprises:
  a processing unit configured to obtain a measurement of the deviation of a signal read from at least one pixel of said assembly of adjacent pixels, wherein the deviation is measured between a first instant, before the instant of impact, and a second instant, after the instant of impact, wherein said first and second instants are determined from the time of impact, and for determining at least one coordinate of the point of interaction from the measurement thus obtained.

13. An ionising radiation detector according to claim 12, wherein the processing unit is configured to measure respective deviations ($M_Q$) of signals read from said assembly of adjacent pixels, wherein the deviations are measured between said first and second instants, with the processing unit determining at least one coordinate of the point of interaction from the deviations thus obtained.

14. An ionising radiation detector according to claim 13, wherein the signals read by the reading channels are filtered by filtering means upstream of the means of synchronisation and means of storage.

15. An ionising radiation detector according to claim 12, further comprising a memory wherein are stored, for each adjacent pixel belonging to said assembly, conditional probabilities of the deviations, $p(M_Q|x_i)$, for multiple discrete values of the coordinate $x_i$, i=1, . . . , N.

16. An ionising radiation detector according to claim 12, further comprising a memory wherein are stored, for each adjacent point belonging to said assembly, a table which gives statistical distribution of the deviations of the signal read for this pixel.

* * * * *